US010402042B2

(12) United States Patent
Geary et al.

(10) Patent No.: US 10,402,042 B2
(45) Date of Patent: Sep. 3, 2019

(54) FORCE VECTOR CURSOR CONTROL

(71) Applicant: LENOVO (Singapore) PTE. LTD., New Tech Park (SG)

(72) Inventors: Matthew Joseph Geary, Raleigh, NC (US); Lincoln Penn Hancock, Raleigh, NC (US); Wesley Abram Luttrell, Raleigh, NC (US); Christopher Miles Osborne, Cary, NC (US); Jeffrey E. Skinner, Raleigh, NC (US); Thomas John Sluchak, Apex, NC (US); Aaron Michael Stewart, Raleigh, NC (US); Jonathan Jen-Wei Yu, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 328 days.

(21) Appl. No.: 15/181,095

(22) Filed: Jun. 13, 2016

(65) Prior Publication Data
US 2017/0357403 A1 Dec. 14, 2017

(51) Int. Cl.
| | |
|---|---|
| *G06F 3/041* | (2006.01) |
| *G06F 3/0481* | (2013.01) |
| *G06F 3/0488* | (2013.01) |
| *G06F 3/038* | (2013.01) |
| *G06F 3/0354* | (2013.01) |

(52) U.S. Cl.
CPC .......... *G06F 3/04812* (2013.01); *G06F 3/038* (2013.01); *G06F 3/03547* (2013.01); *G06F 3/0414* (2013.01); *G06F 3/0416* (2013.01); *G06F 3/0488* (2013.01); *G06F 3/04883* (2013.01); *G06F 2203/04105* (2013.01)

(58) Field of Classification Search
CPC ................. G06F 3/0488; G06F 3/0414; G06F 2203/04105
See application file for complete search history.

(56) References Cited

U.S. PATENT DOCUMENTS

| | | | |
|---|---|---|---|
| 9,652,069 B1* | 5/2017 | Sheik-Nainar | .......... G06F 3/016 |
| 2010/0123679 A1* | 5/2010 | Kim | ....................... G06F 3/0338 345/174 |
| 2010/0149124 A1* | 6/2010 | Kim | ....................... G06F 3/0414 345/173 |
| 2012/0044145 A1* | 2/2012 | Kim | ....................... G06F 3/0338 345/163 |
| 2012/0127206 A1* | 5/2012 | Thompson | ............... G06F 3/038 345/661 |
| 2013/0125067 A1* | 5/2013 | Moon | ................. G06F 3/04812 715/862 |

(Continued)

*Primary Examiner* — Justin S Lee
(74) *Attorney, Agent, or Firm* — Kunzler Bean & Adamson

(57) ABSTRACT

For controlling a cursor using a force vector input by a user touch, an apparatus is disclosed. A system, method, and program product also perform the functions of the apparatus. The apparatus for controlling a cursor using a force vector input by a user touch includes a force sensor operatively coupled to a surface, a processor, and a memory that stores code executable by the processor to: measure a force vector input by a user touch at the surface, the force vector including a magnitude and a direction, translate the magnitude into a cursor velocity, and control movements of a cursor based on the cursor velocity and the determined direction.

19 Claims, 6 Drawing Sheets

(56) References Cited

U.S. PATENT DOCUMENTS

| | | | |
|---|---|---|---|
| 2014/0002398 A1* | 1/2014 | Bao | G06F 3/0488 345/173 |
| 2014/0078060 A1* | 3/2014 | Leung | G06F 3/0354 345/161 |
| 2015/0042565 A1* | 2/2015 | Mizutani | G06F 3/0338 345/161 |
| 2016/0162147 A1* | 6/2016 | Xie | G06F 3/044 345/173 |
| 2016/0357296 A1* | 12/2016 | Picciotto | G06F 3/016 |
| 2016/0357297 A1* | 12/2016 | Picciotto | G06F 3/0488 |
| 2017/0038905 A1* | 2/2017 | Bijamov | G06F 3/0414 |
| 2017/0083135 A1* | 3/2017 | Sheik-Nainar | G06F 3/0412 |

\* cited by examiner

FORCE VECTOR CURSOR CONTROL

FIELD

The subject matter disclosed herein relates to cursor control and more particularly relates to controlling a cursor using a force vector input by a user touch.

BACKGROUND

Description of the Related Art

Touchpads/clickpads are the preferred pointing device for most notebook and laptop users. However, even in the best embodiments, there certain tasks were touchpads are not the most efficient tools. Touchpads/clickpads allow users to manipulate a pointer through a direct positional relationship. Accordingly, moving a finger on the touchpad results in a proportional response on-screen. For many tasks, the spatial mapping provides a suitable way to interact with a graphical user interface ("GUI"). However, certain tasks such as moving the cursor long distances and clicking and dragging require users to make repeated movements and awkward multi-finger gestures that are inefficient.

BRIEF SUMMARY

An apparatus for controlling a cursor using a force vector input by a user touch is disclosed. A method and computer program product also perform the functions of the apparatus.

The apparatus for controlling a cursor using a force vector input by a user touch includes a force sensor operatively coupled to a surface, a processor, and a memory that stores code executable by the processor to: measure a force vector input by a user touch at the surface, the force vector including a magnitude and a direction, translate the magnitude into a cursor velocity, and control movements of a cursor based on the cursor velocity and the determined direction.

In one embodiment, measuring the force vector includes the processor determining a finger tilt corresponding to the force vector input and computing a direction component based on the finger tilt. In another embodiment, measuring the force vector includes the processor determining a contact area corresponding to the force vector input, the contact area corresponding to an area of the surface being touched and computing a direction component based on a geometry of the contact area. In certain embodiments, measuring the force vector includes the processor detecting two or more simultaneously input force vectors, selecting a gesture command based on the simultaneously input force vectors, and controlling a user interface based on the selected gesture command.

In some embodiments, the apparatus also includes a touch sensor operatively coupled to the surface, the touch sensor measuring a touch location of the user touch. In one such embodiment, the processor identifies a touch location corresponding to the user-input force vector, designates a button region on the surface based on the touch location, and controls a user interface based on one or more touches at the button region.

In another such embodiment, the processor dynamically switches between position-based control of the cursor and pressure-based control of the cursor based on user input. In further embodiments, the processor identifies an amount of force corresponding to the user touch, and switches to a pressure-based control of the cursor in response to the amount of force exceeding a threshold amount of force. In additional embodiments, the processor measures, using the touch sensor, an amount of movement corresponding to the user touch and switches to a position-based control of the cursor in response to the amount of movement exceeding a threshold amount of movement.

In one embodiment, the surface includes a designated region, the processor determining whether a user is touching the designated region. The designated region may be a visually marked region, a protruding region, and/or a textured region. In this embodiment, the processor measuring the force vector occurs in response to the user touching the designated region.

A method for controlling a cursor using a force vector input by a user touch includes measuring, by use of a processor, a force vector input by a user touch at a surface, translating a magnitude of the force vector into a cursor velocity, and controlling movements of a cursor using the cursor velocity and a direction of the force vector.

In some embodiments, the method includes identifying a touch location corresponding to the user-input force vector, designating a button region on the surface based on the touch location, and controlling a user interface based on one or more touches at the button region. In one embodiment, measuring the force vector includes determining a finger tilt corresponding to the force vector input and computing a direction component based on the finger tilt. In another embodiment, measuring the force vector includes determining a contact area corresponding to the user touch, the contact area corresponding to an area of the surface being touched, and computing a direction component based on a geometry of the contact area. In certain embodiments, measuring the force vector includes detecting two or more simultaneously input force vectors, selecting a gesture command based on the simultaneously input force vectors, and controlling a user interface based on the selected gesture command.

In some embodiments, the method includes switching dynamically between a position-based control mode of the cursor and a force-based control mode of the cursor based on user input. In certain embodiments, dynamically switching between the position-based control mode and the force-based control mode includes switching to the force-based control mode in response to an amount of force corresponding to the user touch exceeding a threshold amount of force and an amount of movement corresponding to the user touch not exceeding a threshold amount of movement.

A program product including a computer readable storage medium that stores code executable by a processor, the executable code including code to perform: measuring a force vector input by a user at a surface, translating a magnitude of the force vector into a cursor velocity, and controlling movements of a cursor using the cursor velocity and a direction of the force vector.

In some embodiments, the code further performs: identifying a touch location corresponding to the user-input force vector, designating a button region on the surface based on the touch location, and controlling a user interface based on one or more touches at the button region. In one embodiment, the code further performs: switching dynamically between a position-based control mode of the cursor and a force-based control mode of the cursor based on user input. In certain embodiments, the code further performs: determining whether a user is touching a designated region of the surface. In such embodiments, measuring the force vector occurs in response to the user touching the designated region.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
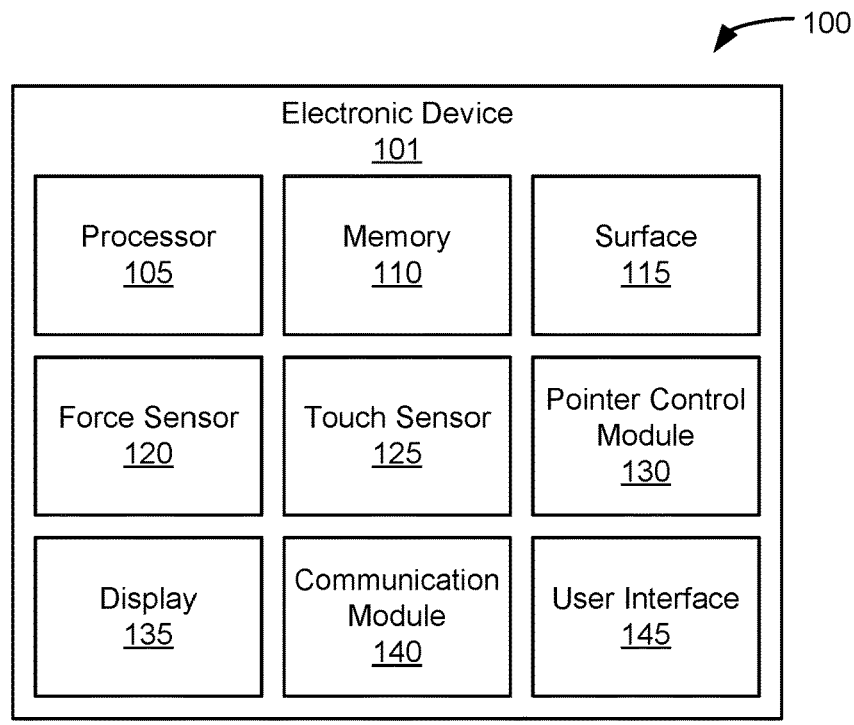
FIG. 1 is a schematic block diagram illustrating one embodiment of a system for controlling a cursor using a force vector input by a user touch.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Recent advancements in touchpad technologies have replaced a moving mechanism with a force sensor/strain gauge. By sensing force applied, the touchpad determines whether the user is tracking or clicking. Accordingly, touchpad with a force sensor allows a computing system to track both finger position and finger force/direction. This allows the computing system to switch between a pressure/force-based cursor control paradigm and a positional cursor control paradigm. The disclosed embodiments describe ways of switching between these two paradigms depending on the task and user preference. With the pressure/force-based cursor control paradigm, the computing device uses a force to velocity mapping to control cursor. This allows users a more efficient control over longer tasks.

FIG. 1 is a schematic block diagram illustrating a system 100 for controlling a cursor using a force vector input by a user touch, according to embodiments of the disclosure. The system 100 includes an electronic device 101 that receives user input comprising a pressure and a direction and controls the user interface based on the user input. In the depicted embodiment, the electronic device 101 includes a processor 105, a memory 110, a surface 115, a force sensor 120, a touch sensor 125, a pointer control module 130, a display 135, a communication module 140, and a user interface module 145.

In some embodiments, the electronic device 101 may be a standalone pointer device connectable to another computing device (not shown), such as a personal computer, mainframe, server, terminal station, laptop computer, desktop computer, tablet computer, smartphone, and the like. Where the electronic device 101 acts as a standalone pointer device, the display 135 and user interface module 145 are optional components and may be omitted to reduce cost of the electronic device 101. In this embodiment, the computing device may include a display and user interface module, wherein the pointer control module 130 communicates with the display and user interface module via the communication module 140. In one embodiment, the pointer control module 130 acts as a device driver interfacing between the pointing device portion and an operating system running on the remote computing device to control the cursor. In another embodiment, the pointer control module 130 may communicate with a separate device driver installed on the computing device to control the cursor.

In other embodiments, the surface 115, force sensor 120, touch sensor 125, and communication module 140 may form a pointing device and be located remote from the rest of the electronic device 101. In such embodiments, the pointer control module 130 may receive user input at the surface 115 from the force sensor 120 and/or touch sensor 125, communicating with the sensors 120-125 via the communication module 140. In one embodiment, the pointer control module 130 acts as a device driver interfacing between the pointing device portion and an operating system running on the electronic device 101 to control the cursor. In another embodiment, the pointer control module 130 may communicate with a separate device driver installed on the electronic device 101 to control the cursor.

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, an integrated circuit, or similar controller. In certain embodiments, the processor 105 may include a plurality of processing units, such as a plurality processing cores, a plurality of CPUs, a plurality of microcontrollers, or the like. In some embodiments, the processor 105 executes instructions stored in the memory 110 to perform the methods and routines described herein. The processor 105 is communicatively coupled to the memory 110, the pointer control module 130, the display 135, the communication module 140, and the user interface 145. In some embodiments, the processor 105 is also communicatively coupled to the force sensor 120 and the touch sensor 125.

The memory 110, in one embodiment, is a computer readable storage medium. In some embodiments, the memory 110 includes volatile computer storage media. For example, the memory 110 may include a random access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores additional data relating to pressure-based cursor control. For example, the memory 110 may store a force vector, a magnitude-to-velocity mapping, virtual button preferences (e.g., size and placement), and the like. In some embodiments, the memory 110 also stores program code and related data, such as an operating system or other controller algorithms operating on the electronic device 101.

The surface 115, in one embodiment, is an outer surface of the electronic device 101. The service 115 may comprise only a portion of the outer surface. The surface 115 provide an area for the user can interact with the user interface 145. The surface 115 is coupled to the force sensor 120 such that the force sensor 120 senses an amount of force (e.g., a pressure) applied to the surface 115. Generally, the surface 115 is a planar area on the outer surface of the electronic device 101. However, in other embodiments, the surface 115 may include a rounded region, an edge region, and/or a corner region of the outer surface of the electronic device 101.

In some embodiments, the surface 115 includes a designated region for receiving user input using a force vector, as will be discussed in detail below. This designated region may be a protruding region, a visually marked region, and/or a textured region. In one embodiment, the designated region is a protruding region that extends from a planar area of the surface 115. The protruding region may be a concave protrusion, a convex protrusion, or a flat surfaced protrusion. The protrusion may extend from the surface by relatively small amount, but with sufficient extension to be tactilely noticeable by a user. In certain embodiments, the protruding region may also be visually noticeable by a user. Accordingly, the user may place a fingertip, stylus, or the like on the protruding region and control cursor by applying force to the protruding region, as discussed below in detail.

In one embodiment, the designated region is visually designated using a visual marking. For example, the visually marked region may be a painted or screen printed area on the surface 115. Where the surface 115 is co-located with the display 135 (e.g., forming a touchscreen display), the designated region may be visually designated using an icon, button, shape, or other visual marking presented by the display 135.

In one embodiment, the designated region is a textured region that is tactilely distinct from the rest of the surface 115. For example, the textured region may use a separate material than the rest of the surface 115. As another example, the textured region may be stippled, or otherwise patterned, in a manner different from the rest of the surface 115. Thus, the surface 115 may have a smooth texture except at the designated region. In further embodiments, the designated region may be a combination of a protruding region, a visually marked region, and a textured region.

The force sensor 120 is operatively coupled to the surface 115. The force sensor 120 detects pressure (e.g., a relative pressure) applied to a plurality of points (e.g., subareas) on the surface 115. In some embodiments, the force sensor 120 comprises a plurality of sensors to detect a pressure at different points on the surface 115. Thus, the force sensor 120 can detect a pressure differential between different positions on the surface 115. In certain embodiments, the force sensor 120 may be embedded within the surface 115.

The touch sensor 125 is operatively coupled to the surface 115. The touch sensor 125 detects a location of the user touch on the surface 115 (referred to as a touch location). The touch sensor 125 also detects movement of the user touch on the surface 115. For example, the touch sensor 125 may detect the changes in touch location as the user slides a finger or stylus across the surface 115. In certain embodiments, the touch sensor 125 may comprise a plurality of sensors, for example arranged in a grid. In one embodiment, the touch sensor 125 is co-located with the force sensor 120, such that an amount of pressure applied to the surface 115 can be detected at the location of the user touch.

The pointer control module 130, in one embodiment, measures a force vector input by a user touch at the service 115 (the force vector including a magnitude and a direction), translates the magnitude into a cursor velocity, and controls movements of the cursor based on the cursor velocity and the force vector direction. In certain embodiments, the pointer control module 130 designates a button region on the surface 115 based on a touch location corresponding to the force vector and controls the user interface 145 based on one or more touches at the button region. In further embodiments, the pointer control module 130 dynamically switches between position-based control of the cursor and pressure-based control of the cursor based on user input. For example, the pointer control module 130 may switch to a pressure-based control of the cursor in response to an amount of force exceeding a threshold amount of force and an amount of movement of the user touch not exceeding a threshold amount of movement.

Embodiments of the pointer control module 130 are described in further detail below. In some embodiments, the pointer control module 130 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

The display 135, in one embodiment, may comprise any known electronic display capable of outputting visual data to a user. As used herein, the display 135 refers to a physical, electronic display component of the electronic device 101. For example, the display 135 may be an LCD display, an LED display, an OLED display, a projector, or similar display device capable of outputting images, text, characters, and the like to a user. The display 135 may display a user interface 145, such as a graphical user interface (GUI). The display 135 may receive data for display from the processor 105, the memory 110, and/or the distributed acquisition module 130.

While not depicted, the electronic device 101 may include one or more additional input devices (e.g., apart from the force sensor 120 and touch sensor 125) for receiving user input. For example, the electronic device 101 may include one or more buttons or keys configured to receive user input. Further, the electronic device 101 may include a microphone for receiving voice input from the user.

The communication module 140 may include communication hardware and/or software. In one embodiment, the communication module 140 communicates sensor data from the force sensor 120 and/or the touch sensor 125 to the pointer control module 130. In another embodiment, the communication module 140 communicates cursor control commands from the pointer control module 130 to a remote computing device. The communication module 140 may communicate using wired and/or wireless communication links.

The user interface 145 facilitates interaction between the user and the electronic device 101. Generally, the user interface 145 is a graphical user interface (GUI) using graphical icons and other visual indicators. The user interface 145 includes a cursor (also referred to as a pointer) that shows a current position for user interaction. The pointer control module 130 controls movement of the cursor on the user interface 145 responsive to user input, such as a force vector applied to the surface 115. In one embodiment, the user interface 145 is a portion of an operating system of the electronic device 101 running on the processor 105.

By sensing the force applied to the surface 115 and a direction of the applied force, the pointer control module 130 control the cursor using pressure-based cursor As used herein, pressure-based cursor control refers to translating a magnitude and a direction of force applied to the surface 115 to cursor motion. Further, the pointer control module 130 can switch between the pressure-based cursor control and the position-based cursor control of traditional touchpads.

Additionally, the pointer control module 130 can sense a first finger used to control movement of the cursor by applying force to the surface 115 and particular direction, and also senses a second finger used for clicking actions (e.g., mouse click action) to interact with the user interface 145, for example to perform a click-and-drag action. In contrast, traditional touchpads require several repeated movements to perform the same click-and-drag action.

When equipped with the pointer control module 130, the electronic device 101 can replace and/or supplement traditional swipe/tap gestures with force/direction gestures. For example, rather than swiping left with three fingers from the right edge of the touchscreen/touchpad, a user may perform an equivalent gesture by applying force with three fingers and tilting the fingers to the left (or, alternatively pushing to the left with the three fingers).

Figure 2:
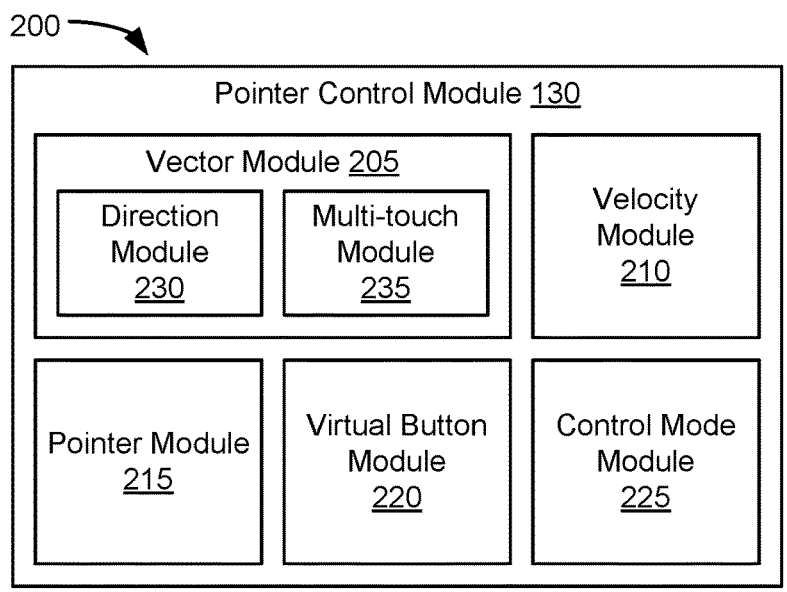
FIG. 2 is a schematic block diagram illustrating one embodiment of an apparatus for controlling a cursor using a force vector input by a user touch.

FIG. 2 is a schematic block diagram illustrating an apparatus 200 for controlling a cursor using a force vector input by a user touch, according to embodiments of the disclosure. The apparatus 200 includes a pointer control module 130, which may be one embodiment of the pointer control module 130 described above with reference to FIG. 1. The pointer control module 130 includes a vector module 205, a velocity module 210, and a pointer control module 215. As depicted, the pointer control module 130 may also include a virtual button module 220 and a control mode module 225. Additionally, the vector module 205 may include a direction module 230 and a multi-touch module 235. The modules 205-235 may be communicatively coupled to one another. The pointer control module 130 may comprise hardware circuits, program code operating on a processing device, or a combination of hardware circuitry and program code.

The vector module 205, in one embodiment, measures a force vector input by a user touch at the surface 115. As used herein, a "force vector" refers to user-applied force at the surface and contains a magnitude (also referred to as "pressure") and a direction. In one embodiment, the force vector includes a perpendicular component describing force applied in a direction perpendicular to the surface 115 and a parallel component describing force applied in a direction parallel to the surface 115. Each force vector corresponds to a user touch of the surface 115. In one embodiment, the user touch is a result of the user pressing a finger, thumb, or other appendage on the surface 115. In another embodiment, the user touch is a result of the user pressing a stylus, electronic pen, or the like, onto the surface 115.

As discussed above, the surface 115 may include a designated region. In one embodiment, the vector module 205 determines whether the user is touching a designated region of the surface 115. In response to the user touching the designated region, the vector module 205 may measure a force vector of the user touch. For example, the vector module 205 may measure, via the force sensor 120, an amount of force applied at the designated region.

In certain embodiments, the vector module 205 may refrain from measuring the force vector (e.g., combination of magnitude/pressure and a direction) until the pressure sensed at the surface 115 exceeds a threshold amount (e.g., an activation threshold). In such embodiments, the vector module 205 may receive input from the force sensor 120 indicating an amount of pressure at the surface 115. In response to the pressure at the surface 115 exceeding the activation threshold, the vector module 205 may determine a direction associated with the user touch and combine the measured pressure (e.g., magnitude) with the determined direction to form the force vector.

In one embodiment, the vector module 205 may receive the direction from the force sensor 120, the touch sensor 125, or combinations thereof. In another embodiment, the vector module 205 may include a direction module 230 that determines the direction of the force vector. In such embodiments, the direction module 230 analyzes data received from the sensors 120-125 to determine a direction of the force vector. In one embodiment, the direction includes an x-axis component and a y-axis component. The vector module 205 may comprise hardware circuits, program code operating on a processing device, or a combination of hardware circuitry and program code.

In determining the direction of the force vector, the direction module 230 may identify an x-axis component and a y-axis component of the force vector. In one embodiment, the x-axis and y-axis corresponds to a vertical axis and horizontal axis of the user interface 145. In another embodiment, the x-axis and y-axis may correspond to a longitudinal axis spanning the length of a physical display (e.g., display 135) and a lateral axis spanning the width of the physical display. Further, the x-axis component and y-axis component may depend on an orientation of the display 135 and/or user interface 145. Thus, if the user interface 145 rotates or otherwise changes orientation in response to a change in physical orientation of the electronic device 101 (e.g., a user rotating the display 135 from a portrait orientation to a landscape orientation), then the direction module 230 may reinterpret the x-axis component and the y-axis component based on the new orientation.

In some embodiments, the direction module 230 may use a pressure map corresponding to the user touch to determine the direction component of the force vector. As user herein, a pressure map refers to a mapping of force (e.g., pressure) values at different points on the surface 115. The pressure map may have sufficient resolution to represent the contact area of the user touch with several points on the pressure map. For example, the resolution may be sufficient to map at least twelve points on the pressure map to a fingertip touching the surface 115. The direction module 230 may then derive the direction from a pattern of the user touch in the pressure map.

In certain embodiments, the direction module 230 determines the force vector direction by detecting a finger tilt of the user touch. For example, a user may initially touch the surface 115 with the pad of the fingertip and then quickly tilt the finger in a particular direction. The direction module 230 then computes a direction for the force vector based on the finger tilt. In certain embodiments, the vector module 205 may adjust the magnitude of the force vector based on an amount of finger tilt.

In one embodiment, finger tilt is detected by a change in relative pressure applied at a contact area of the user touch. As used herein, a contact area refers to the area of the surface 115 in contact with the user (or stylus) during the user touch. In another embodiment, finger tilt is detected by a change in the geometry (e.g., shape) of the contact area. For example, when the user pushes the surface in a given direction, a portion of the fingertip, stylus tip, etc. may lift from the surface 115. In further embodiments, the direction module 230 may compute the direction based on an initial geometry of the contact area.

In certain embodiments, the vector module 205 includes a multi-touch module 235 that interprets two or more simultaneously input user touches. For example, the user may touch the surface 115 with two or more fingers. As another example, the user may touch the surface 115 with a stylus and with a finger. In one embodiment, the multi-touch module 235 receives an indication from the touch sensor 125 of two or more simultaneous user touches. In another embodiment, the force sensor 120 may report force being applied to non-contiguous regions of the surface 115, wherein the vector module 205 queries the multi-touch module 235 to resolve to multiple user touches.

In certain embodiments, the multi-touch module 235 determines whether the multiple simultaneous user touches are indicative of the user performing a gesture command at the surface 115. For example, the user may use two fingers to perform a pinch gesture at the surface 115. As another example, the user may use two or more fingers to perform a scroll gesture. In response the user inputting a gesture command, the pointer module 215 controls the user interface based on the input gesture.

The multi-touch module 235 interprets as input gestures any multi-touch input with moving touch locations (e.g., due to the finger/stylus moving across the surface 115). However, where the touch location are static (or nearly static), the multi-touch module 235 analyzes force vector corresponding to the multiple user touches to determine whether the user is inputting a static gesture command. As used herein, a static gesture command refers to a gesture command where the locations of the user touches remain substantially static while the user performs the gesture. One example of a static gesture commands is a static pinch/zoom gesture where the force vectors of the two user touches have opposite directions. Another example of a static gesture is a static scroll gesture where the force vectors of two or more user touches are in the same direction.

In some embodiments, the multi-touch module 235 may distinguish between an intentional touch and an unintentional touch based on the magnitude of the force vector. For example, if the force vector magnitude of a first user touch is significantly less than that of another user touch (e.g., less than 25%), then the first user touch may be determined to be unintentional (e.g., incidental). As another example, the multi-touch module 235 may determine an additional touch to be unintentional if a contact area corresponding to the additional touch has a particular shape and/or size indicating an unintentional touch (e.g., due to the hand and/or palm accidentally contacting the surface 115). Likewise, the multi-touch module 235 may determine an additional touch to be unintentional based on a location of the additional touch (e.g., ignoring touches at a border of the surface 115).

An intentional touch may be due to the user inputting a mouse/button click at the surface 115. For example, a user may use a stylus to control the cursor location and a finger to input mouse clicks. As another example, a user may use one finger to control the cursor location and another finger to input mouse clicks. Unintentional additional touches are ignored by the pointer control module 130, for example when identifying a cursor velocity, a direction for cursor control, a button/mouse click, a control mode, and the like.

The direction module 230 may comprise hardware circuits, program code operating on a processing device, or a combination of hardware circuitry and program code. Likewise, the multi-touch module 235 may comprise hardware circuits, program code operating on a processing device, or a combination of hardware circuitry and program code. As depicted, the direction module 230 and the multi-touch module 235 may be components (e.g., hardware and/or software components) of the vector module 205. However, in other embodiments, one or more of the direction module 230 and the multi-touch module 235 may be an independent component communicatively coupled to the vector module 205.

In some embodiments, the direction module 230 may calculate a force vector direction based on a plurality of force vectors (e.g., due to a plurality of simultaneous user touches). Where an additional touch is determined to be unintentional, the direction module 230 may ignore the unintentional touch when calculating the direction. Otherwise, where the plurality of force vectors are due to a plurality of intentional user touches (e.g., a scroll gesture command), the direction module 230 may calculate the direction to be an average value of the directions of the individual force vectors or, alternatively, may calculate the direction based on a single force vector (e.g., a force vector having the greatest magnitude). The pointer module 215 may then control the user interface using the input gesture (e.g., scroll gesture) and the determined direction (e.g., a direction from scrolling).

The velocity module 210, in one embodiment, translates the magnitude into a cursor velocity. In one embodiment, the velocity module 210 may linearly map an amount force (e.g., a magnitude of the force vector) to a cursor velocity, such that the cursor velocity is directly proportional to the magnitude of the force vector. For example, where X amount of force to the surface 115 corresponds to Y cursor velocity, if the user applies 2X amount force to the surface 105, the resulting cursor velocity will be 2Y.

In other embodiments, the velocity module 210 may use nonlinear mapping of the magnitude (e.g., amount of force/pressure applied to the service 115) to the cursor velocity. For example, at a lower range of magnitude values the cursor velocity may increase at a smaller rate with increased pressure than at a middle range of magnitude values. Further, at a high range of magnitude values, the cursor velocity may also increase at a smaller rate with increased pressure than at the middle range of magnitude values. Additionally, in certain embodiments, the velocity module 210 may be configured with a maximum cursor velocity, such that the cursor velocity will not increase with increased pressure (e.g., increased magnitude of the force vector) once the maximum cursor velocity is reached.

In some embodiments, the velocity module 210 may calculate a cursor velocity based on a plurality of force vectors (e.g., due to a plurality of simultaneous user touches). In such embodiments, the multi-touch module 235 may distinguish between an intentional additional touch and an unintentional additional touch. Where an additional touch is determined to be unintentional, the velocity module 210 may ignore the unintentional touch when calculating the cursor velocity. Otherwise, where the plurality of force vectors are due to a plurality of intentional user touches, the velocity module 210 may calculate the cursor velocity to be an average value of the magnitudes of the individual force vectors or, alternatively, may calculate the cursor velocity based on a single force vector (e.g., the force vector having the greatest magnitude). The velocity module 210 may comprise hardware circuits, program code operating on a processing device, or a combination of hardware circuitry and program code.

The pointer module 215, in one embodiment, controls movements of a cursor based on the cursor velocity and the direction of the force vector. The pointer module 215 may output commands for controlling the cursor using any known protocol. For example, the pointer module 215 may instruct an operating system or user interface to move the cursor in the direction of the force vector and at a speed corresponding to the cursor velocity. In this example, the pointer module 215 may interact with a mouse driver or similar device driver to control the cursor location.

In some embodiments, the pointer module 215 may generate mouse click events for controlling the user interface. In further embodiments, the pointer module 215 may generate gesture commands based on user interaction with the surface 115. Thus, a user may interact with a user interface 145 using a combination of cursor movement, mouse clicks, and gestures. In certain embodiments, the pointer module 215 may be configured to control the cursor location based on location of the user touch using a positional-based control scheme, as discussed in further detail below. The pointer module 215 may comprise hardware circuits, program code operating on a processing device, or a combination of hardware circuitry and program code.

The virtual button module 220, in one embodiment, designates a button region on the surface 115 based on a location of the user touch. The button region may correspond to one or more virtual buttons. The virtual button module 220 may further control a user interface 145 based on subsequent touches at the button region. For example, the virtual button module 220 may identify a touch location of the user touch and designate a button region on the surface 115 in response to the user touch. Where the surface 115 is the surface of a touchscreen display, the button region may correspond to an area of the touchscreen and the virtual buttons may be displayed in that area. As the user presses the one or more virtual buttons, the virtual button module 220 may then generate input events (e.g., mouse click events) corresponding to the one or more virtual buttons.

In some embodiments, the virtual button module 220 designates a button region that is a predetermined distance from the touch location. In further embodiments, the distance may be user configurable and, optionally, a predetermined distance may be configured and stored for each user of the pointing device 101. Likewise, a size of the button region and/or of the one or more virtual buttons may be user configurable and (optionally) configured for each user of the pointing device 101.

In certain embodiments, the virtual button module 220 may designate three virtual buttons: a virtual left button, virtual center button, and virtual right button. The virtual left button and virtual right button may correspond to left and right mouse buttons, respectively. In one embodiment, the virtual center button corresponds to a center mouse button. In another embodiment, the virtual center button corresponds to a TrackPoint center button. For example, the user may press and hold the virtual center button to scroll through the document using pressure-based cursor control. In this example, the user moves the cursor to window for scrolling and presses (e.g., holds down) the virtual center button, wherein the user interface 145 scrolls through a document (e.g., a webpage) displayed in the window in a direction corresponding to the force vector direction and with a scroll speed based on the magnitude of the force vector.

In another example, the user may press and hold the virtual center button to magnify a portion of the user interface 145. In this example, the user moves the cursor to portion of the user interface 145 for magnifying and presses/holds the virtual center button, wherein the virtual button module 220 magnifies (e.g., in a pop-up window) a portion of the user interface 145 surrounding the cursor. If the user continues pressing the virtual center button while inputting a force vector at the surface 115, the cursor (and the magnified area) moves. Additional functionalities, such as adjusting a magnification level and the size of the pop-up window, may be achieved by pressing the virtual center button in combination with one of the virtual left button and virtual right button.

The virtual button module 220 may comprise hardware circuits, program code operating on a processing device, or a combination of hardware circuitry and program code. While depicted as a separate component of the pointer control module 130, in certain embodiments the virtual button module 220 may be a part of the pointer module 215.

The control mode module 225, in one embodiment, dynamically switches between position-based cursor control and pressure-based cursor control based on user input. As used herein, position-based cursor control refers to translating the motion and position of a user touch on the surface 115 to cursor motion and position. A conventional track pad operates using position-based control. In contrast, pressure-based cursor control, translating a magnitude and a direction of force applied to the surface 115 to cursor motion.

The control mode module 225 may evaluate one or more factors when determining whether to switch to pressure-based cursor control. These factors include an amount of pressure applied to the surface 115, an amount of movement corresponding to the user touch, a duration of the user touch, and a location of the user touch. Additionally, the control mode module 225 may switch to (or away from) the pressure-based cursor control in response to commands from the user including the user pressing a specific key combination, a user pressing a physical switch or on-screen button, a voice command, and the like.

The control mode module 225 may determine whether an amount of force (pressure) applied to the surface 115 exceeds a threshold amount of pressure. The control mode module 225 may consider a force vector component parallel to the surface 115 and/or a force component that is perpendicular to the surface 115. If the force exceeds the threshold amount, then the control mode module 225 determines this factor to be in favor of pressure-based cursor control. Otherwise, the user may not intend to switch to pressure-based cursor control as the touch may be a mouse click or an accidental touch.

In one embodiment, the threshold amount of force may be predefined by a manufacturer, distributor, or other provider of the x200. In another embodiment, the threshold amount may be user-defined and/or learned. For example, the user may train the control mode module 225 by performing one or more calibration routine to set or adjust the threshold amount of force required to switch to pressure-based cursor control.

The control mode module 225 may determine whether an amount of movement of the user touch exceeds a threshold amount of motion. The pressure-based cursor control is characterized by a predominantly static user touch. However, there may be some measurable movement (e.g., based on a sensitivity of the touch sensor 125) of the user touch based on finger tilt, contact area shift as the user applies force in a particular direction to control the cursor.

The control mode module 225 may compare an amount of movement, such as a distance traveled, and/or timing of the movement to one or more thresholds. If the movement remains below the threshold amount(s), then the control mode module 225 determines this factor to be in favor of pressure-based cursor control. This factor may have a greater weight compared to other factors as pressure-based cursor control is characterized by a predominantly static user touch.

The control mode module 225 may determine whether a duration of the user touch exceeds a threshold amount of time. For example, a user may intend a static user touch of short duration to correspond to a mouse click rather than pressure-based cursor control. If the duration exceeds the threshold amount, then the control mode module 225 determines this factor to be in favor of pressure-based cursor control. Generally, once the control mode module 225 switches to the pressure-based cursor control, the control mode remains in pressure-based cursor control until the user touch ends.

The control mode module 225 may determine whether the user touch is located in the designated area. As discussed above, the surface 115 includes an area designated for controlling the cursor using an applied pressure and direction (e.g., pressure-based cursor control). If the user touch originates in the designated area, then the control mode module 225 determines this factor to be in favor of pressure-based cursor control. This factor may have a greater weight compared to other factors as the designated area of the surface 115 is designated for pressure-based cursor control.

The control mode module 225 may comprise hardware circuits, program code operating on a processing device, or a combination of hardware circuitry and program code. While described as a separate component of the pointer control module 130, in certain embodiments the control mode module 225 may be a part of the pointer module 215.

Figure 3A:
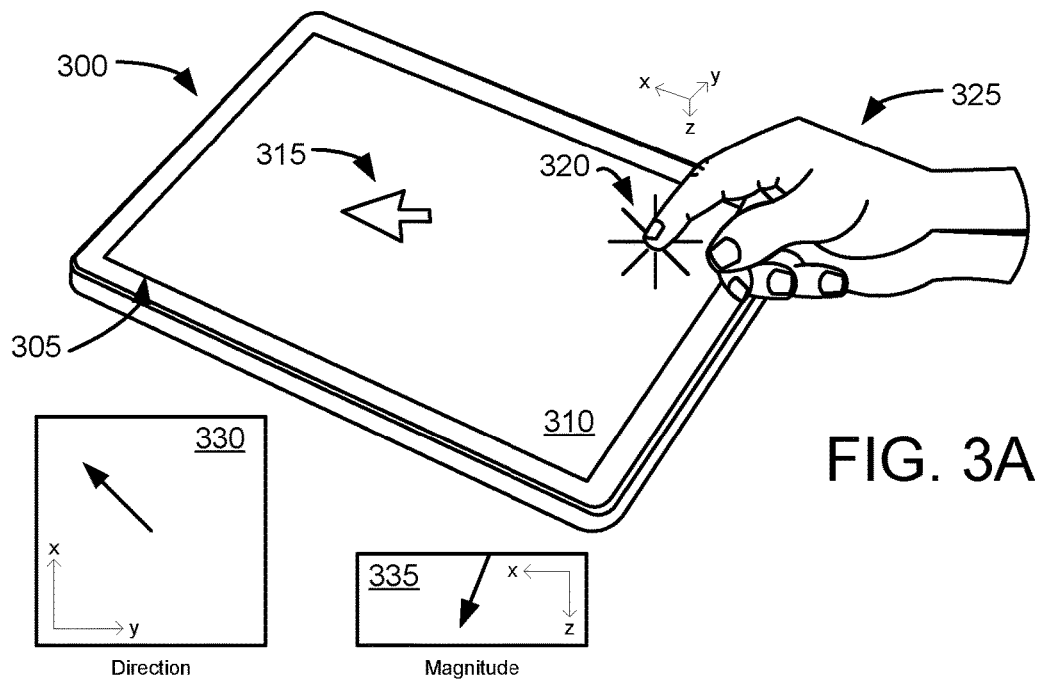
FIG. 3A is a diagram illustrating one embodiment of a tablet computer for controlling a cursor using a force vector input by a user touch at a first moment in time.
Figure 3B:
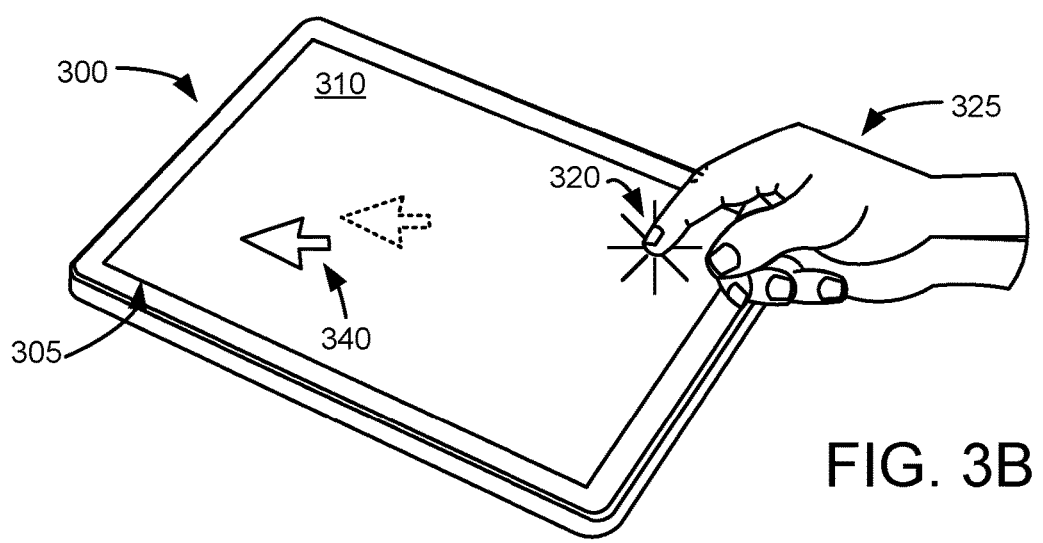
FIG. 3B is a diagram illustrating the tablet computer of FIG. 3A at a second moment in time.

FIGS. 3A-3B depict a tablet computer 300 for controlling a cursor using a force vector input by a user touch, according to embodiments of the disclosure. FIG. 3A depicts the tablet computer 300 at a first moment time of FIG. 3B depicts the tablet computer 300 at a second moment in time. The tablet computer 300 is one embodiment of the electronic device 101 described above with reference to FIGS. 1-2. As depicted, the tablet computer 300 includes a touchscreen display 305 displaying a cursor 315 for interacting with a user interface (not shown) also displayed on the touchscreen display 305. In one embodiment, the user interface is generated by an operating system running on the tablet computer 300.

The touchscreen display 305 contains touch sensors (e.g., an embodiment of the touch sensor 125) layered atop a display (e.g., an embodiment of the display 135). The touchscreen display 305 is also coupled to a force sensor (not shown), which may be in an embodiment of the force sensor 120 described above. Here, the touchscreen display 305 forms a display surface 310 with the touch sensors and force sensor detecting a location and force, respectively, corresponding to a user touch 320 at the display surface 310.

As depicted, a user 325 may touch the display surface 310 resulting in a user touch 320. Here, the user touch 320 has a touch location corresponding to a location on the display surface 310 of the user touch 320. Additionally, the user touch 320 results in a force vector, the force vector comprising a direction 330 and the magnitude 335. The user 325 controls the cursor 315 through application of force vector to the display surface 310.

In certain embodiments, the tablet computer 330 determines whether the user touch 320 is an intentional touch or an unintentional touch. The tablet computer 330 ignores unintentional touches. Further, the tablet computer 330 may determine whether an intentional touch is for pressure-based cursor control or for position-based cursor control. In determining whether the user touch 320 should be interpreted as a pressure-based cursor control, the tablet computer 330 may analyze one or more factors, as discussed herein, such as a duration of the user touch 320, a location of the user touch 320, an amount of movement of the user touch 320, an amount of pressure (e.g., magnitude 335) corresponding to the user touch 320, and the like.

In the depicted embodiment, the force vector has a direction 330 with a component in an x-axis and a component in a y-axis. The x-axis and y-axis correspond to a length and width, respectively, of the touchscreen display 305 as shown, the x-axis being perpendicular to the y-axis with the x-y plane being parallel to the display surface 310. In one embodiment, a direction module 230 implemented in the tablet computer 300 determines the direction 330 (including the x-axis component and y-axis component) from the user touch 320. Note that the direction of the force vector will remain constant with respect to the display surface 130, but may be expressed differently based on an orientation of the user interface.

The force vector also includes a magnitude 335 based on an amount of force applied at the display surface 310. The magnitude 335 is a measurement of an amount of pressure applied to the display surface 310 at the location of the user touch 320 as measured by the force sensor 120. In one embodiment, the magnitude 335 may be expressed as having a parallel component and a perpendicular component.

As used herein, a parallel component of the force vector magnitude refers to an amount of force applied in a direction parallel to the display surface 310 (or surface 115). The parallel component is an amount of shearing force applied to the display surface 310 (or surface 115). In one embodiment, a vector module 205 implemented in the tablet computer 300 measures an amount of shear stress at the display surface 310 (e.g., an amount of shearing force applied to an area encompassing the user touch 320). At FIG. 3A, the parallel component is depicted as being in the direction of the x-axis. In other embodiments, the parallel component may be in a direction of the y-axis or in a direction having both an x-axis component and a y-axis component. The direction of the parallel component is relevant as the direction of the force vector, but may be ignored when measuring the magnitude 335.

As used herein, a perpendicular component of the force vector magnitude refers to an amount of force applied in a direction perpendicular to the display surface 310 (or surface 115). The perpendicular component is an amount of compressive force applied perpendicular to the display surface 310 (or surface 115). In one embodiment, a vector module 205 implemented in the tablet computer 300 measures amount of normal stress at the display surface 310 (e.g., an amount of compression). At FIG. 3A, the perpendicular component is depicted as being in the direction of a z-axis, the z-axis being perpendicular to both the x-axis and the y-axis.

FIG. 3B depicts the tablet computer 300 controlling cursor movement/location based on the user touch 320. Here, the tablet computer 300 translates the magnitude 335 into a cursor velocity and uses the determined direction 330 to move the cursor 315 to new location 340. In one embodiment, a velocity module 210 implemented in the tablet computer 300 converts the magnitude 335 into the cursor velocity. For example, the cursor velocity and force vector magnitude may be linearly related, such that an increase in magnitude results in a proportional increase in cursor velocity.

Note that the user 325 controls the cursor position from a point on the touchscreen display 305 separate from that of the cursor 315. Additionally, the user 325 does not need to move the location of the user touch 320 when controlling cursor movement/location. Rather, the tablet computer 300 interprets the force vector applied to the display surface 310 to move the cursor 315 in a direction corresponding to the force vector (e.g., direction 330) and at a cursor velocity based on the force vector magnitude (e.g., magnitude 335). While the user 325 is continuously touching the display surface 310 (e.g., without lifting a finger), the user 325 may apply different amounts force/pressure to the display surface 310 and/or apply force/pressure in different directions in order to control the cursor 315.

Figure 4A:
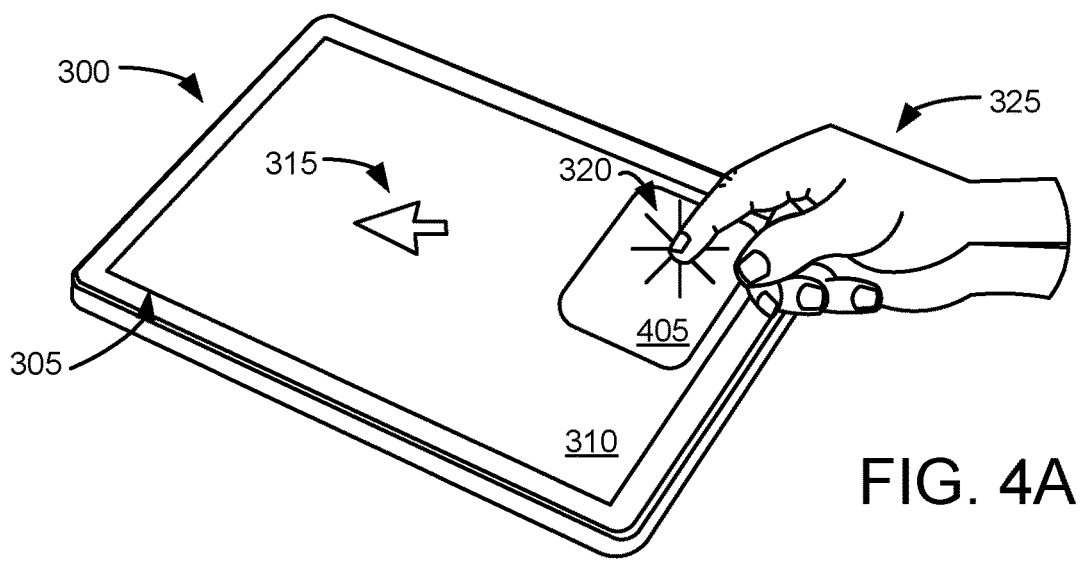
FIG. 4A is a diagram illustrating another embodiment of a tablet computer for controlling a cursor using a force vector input by a user touch.

FIG. 4A depicts an alternative embodiment of the tablet computer 300 described above with reference to FIGS. 3A-3B. In this embodiment, the tablet computer 300 includes a designated region 405 on the display surface 310. The designated region 405 is an area of the display surface 310 selected for controlling the cursor 315 using pressure-based cursor control. Accordingly, when the user touch 320 is located within the designated region 405, the tablet computer 300 presumes that the user 325 intends to control the cursor 315 using pressure-based cursor control. Accordingly, the tablet computer 300 may immediately react to the user touch 320 by moving the cursor 315 according to a direction and magnitude of the force vector corresponding to the user touch 325.

Otherwise, if the user touch 320 originates outside the designated region 405, the tablet computer 300 may wait a short, predetermined amount of time to determine whether the user touch 320 corresponds to user input for controlling the cursor 315 using pressure-based cursor control. As discussed above, the tablet computer 330 may determine that the user touch 320 corresponds to user input for controlling the cursor 315 using pressure-based cursor control when the user touch 320 lasts for more than a predetermined interval (e.g., to differentiate from a button-click touch), has more than a threshold amount of pressure (e.g., to differentiate from an inadvertent touch), and/or has less than a threshold amount of movement (e.g., to differentiate from positional-based cursor control).

Figure 4B:
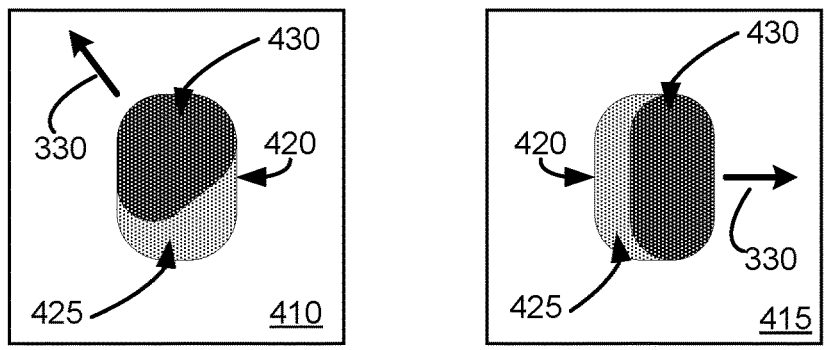
FIG. 4B is a diagram illustrating one embodiment of determining direction of a force vector.
Figure 4C:
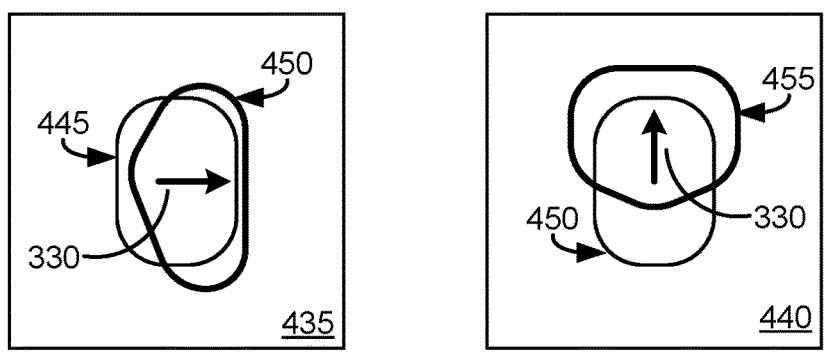
FIG. 4C is a diagram illustrating another embodiment of determining direction of a force vector.

FIG. 4B-4C depict examples of identifying a direction 330 of a force vector. FIG. 4B depicts using relative pressures at a location of the user touch (e.g., the user touch 320) at a first instance 410 and a second instance 415 to identify the direction 330. The user touch (e.g., user touch 320) has a contact area 420 corresponding to a fingertip of the user (e.g., user 325). Within the contact area 420, there are regions of relatively low pressure 425 and regions of relatively high pressure 430. The configuration (e.g., arrangement) of the high-pressure region 420 and low-pressure region 425 correspond to the direction 330 of the force vector. Accordingly, the tablet computer 300 (or electronic device 101) may determine the direction (e.g., direction 330) of the force vector based on relative pressures at points of the display surface 310 encompassed within the contact area 420.

In the depicted embodiment, at the first instance 410 the direction 330 in which the user is applying a force vector corresponds to an upper-leftward direction. Accordingly, at the first instance 410 the tablet computer 300 moves the cursor (e.g., cursor 315) in an upper-leftward direction of the user interface and at a speed corresponding to a magnitude measured at the first instance 410. Additionally, at the second instance 415, the direction 330 in which the user is applying a force vector corresponds to a rightward direction. Accordingly, at the second instance 415 the tablet computer 300 moves the cursor in a rightward direction of the user interface and at a speed corresponding to a magnitude measured at the second instance 415.

In some embodiments, the tablet computer 300 may use a calibration routine that prompts the user to apply force in a prompted direction. The tablet computer 300 may then measure the relative forces at the contact area 420 and map the low-pressure regions 425 and the high-pressure regions 430 to the prompted direction. Later, the tablet computer 300 may refer to the mapping of relative pressures to direction in order to determine a direction of the force vector using relative pressures.

FIG. 4C depicts an example of identifying a direction 330 of a force vector using geometry (e.g., shape) of the contact area corresponding to a user touch at third instance 435 and a fourth instance 440. As discussed above, the contact area may be an area of the display surface 310 in contact with the user's finger, stylus, etc. The contact area may have a first shape 445 when the user is not applying pressure in a particular direction. Thus, where the contact area corresponds to the first shape 445, then the tablet computer 330 may determine that the direction 330 is zero. The first shape 445 is shown as reference in FIG. 4C.

At the third instance 435, the contact area has a second shape 450. Here, the second shape 450 corresponds to a rightward direction. The tablet computer 330 may analyze the geometry of the contact area to determine that the contact area geometry corresponds to the second shape 450 at the third instance 435 and, thus, the direction 330 of the force vector corresponds to the rightward direction. Accordingly, at the third instance 435, the tablet computer 300 moves the cursor in a rightward direction of the user interface and at a speed corresponding to a magnitude measured at the third instance 435

At the fourth instance 440, the contact area has a third shape 455. Here, the third shape 455 corresponds to an upward direction. The tablet computer 330 may analyze the geometry of the contact area at the fourth instance 440 to determine that the contact area geometry corresponds to the third shape 450 and, thus, the direction 330 the force vector corresponds to the upward direction. Accordingly, at the fourth instance 440, the tablet computer 300 moves the cursor in an upward direction of the user interface and at a speed corresponding to a magnitude measured at the fourth instance 440.

In some embodiments, the tablet computer 300 may use a calibration routine that prompts the user to apply force in a prompted direction. The tablet computer 300 may then measure the geometries of the contact areas and map the contact area geometries to the prompted direction. Later, the tablet computer 300 may refer to the mapping of contact area geometries to direction in order to determine a direction of the force vector using contact area geometry.

Figure 5:
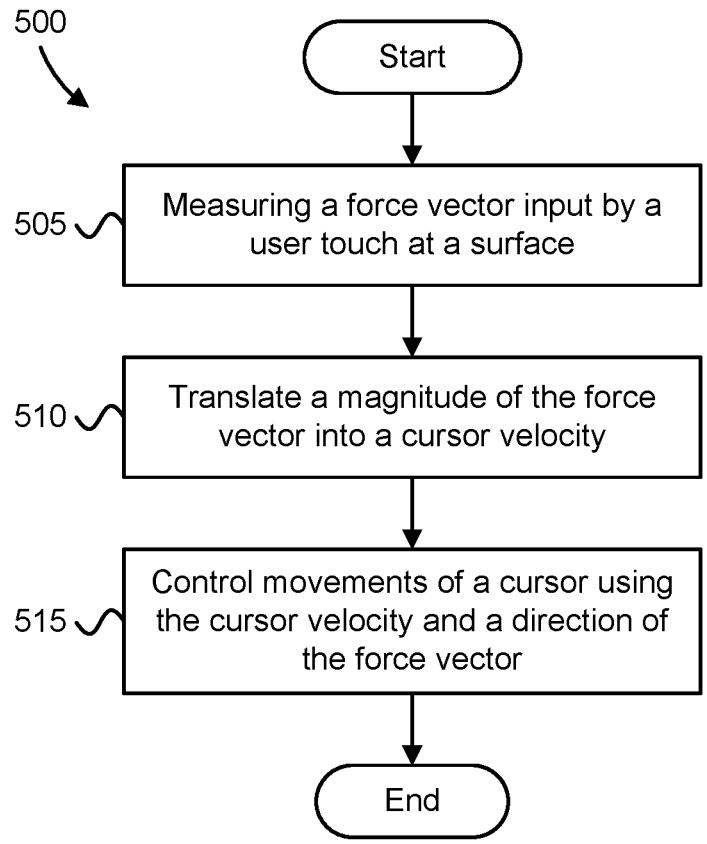
FIG. 5 is a schematic flow chart diagram illustrating one embodiment of a method for controlling a cursor using a force vector input by a user touch.

FIG. 5 is a schematic flow chart diagram illustrating a method 500 for controlling a cursor using a force vector input by a user touch, according to embodiments of the disclosure. In one embodiment, the method 500 is performed by the electronic device 101. In another embodiment, the method 500 may be performed by the apparatus 200. Alternatively, the method 500 may be performed by a processor 105 and a computer readable storage medium, such as the memory 110. The computer readable storage medium may store code that is executed on the processor 105 to perform the functions of the method 500.

The method 500 begins and measures 505 a force vector input by a user touch at a surface. In one embodiment, the force vector is measured 505 by one of the processor 105, the force sensor 120, the pointer control module 130, and the vector module 205. The user touch may correspond to the user pressing a finger, thumb, or the like to the surface. Alternatively, the user touch may correspond to the user pressing a stylus, an electronic pen, or the like to the surface. Measuring 505 the force vector includes measuring a magnitude and a direction of the force vector.

The method 500 translates 510 a magnitude of the force vector into a cursor velocity. In one embodiment, the force vector magnitude is translated 510 into the cursor velocity by one of the processor 105, the pointer control module 130, and the velocity module 210. In some embodiments, the magnitude of the force vector corresponds to an amount of force applied perpendicular to the surface. In other embodiments, the magnitude of the force vector corresponds to an amount of force applied parallel to the surface. In yet other embodiments, the magnitude of the force vector include both an amount of force applied perpendicular to the surface and an amount of force applied parallel to the surface.

The method 500 controls 515 movements of a cursor using the cursor velocity and a direction of the force vector and the method 500 ends. In one embodiment, cursor movements are controlled 515 by one of the processor 105, the pointer control module 130, and the pointer module 215. Controlling 515 movements of the cursor may include instructing an operating system or user interface to move the cursor from a current position in the direction of the force vector and at a speed corresponding to the cursor velocity.

Figure 6:
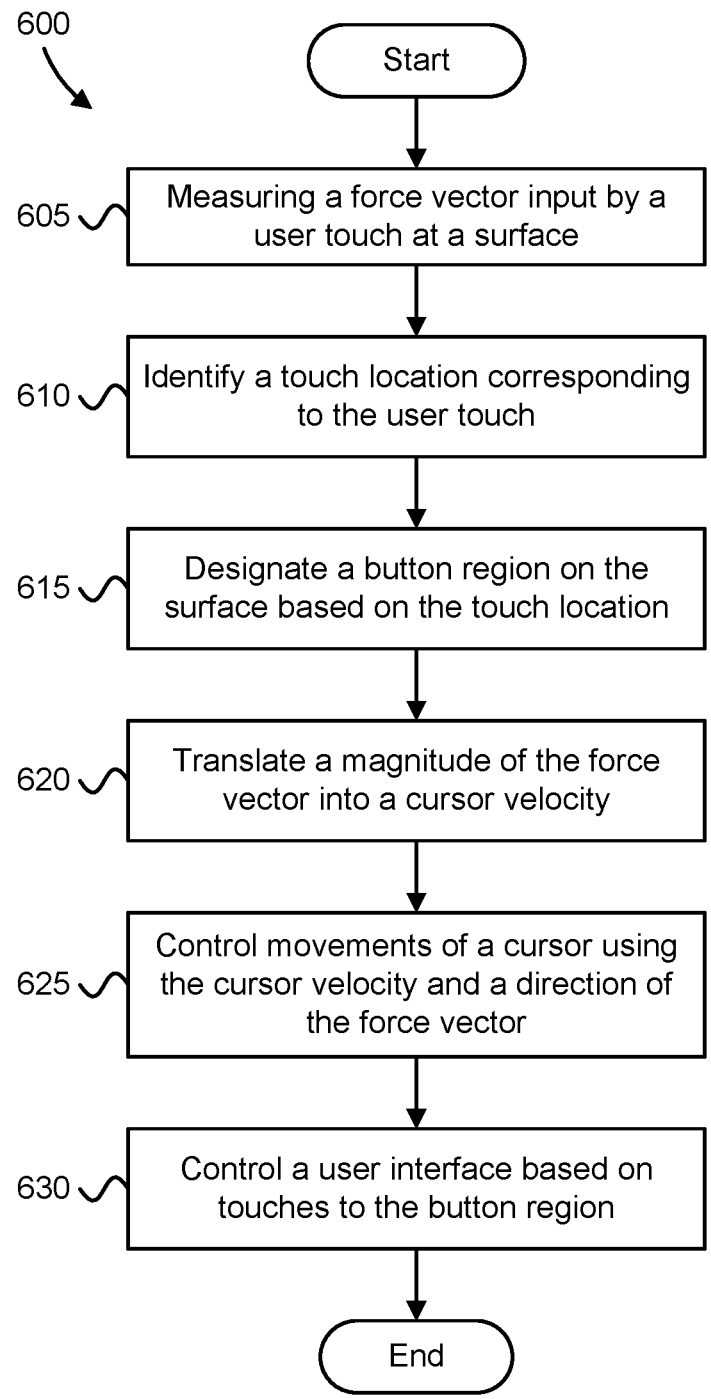
FIG. 6 is a schematic flow chart diagram illustrating another embodiment of a method for controlling a cursor using a force vector input by a user touch.

FIG. 6 is a schematic flow chart diagram illustrating a method 600 for controlling a cursor using a force vector input by a user touch, according to embodiments of the disclosure. In one embodiment, the method 600 is performed by the electronic device 101. In another embodiment, the method 600 may be performed by the apparatus 200. Alternatively, the method 600 may be performed by a processor 105 and a computer readable storage medium, such as the memory 110. The computer readable storage medium may store code that is executed on the processor 105 to perform the functions of the method 600.

The method 600 begins and measures 605 a force vector input by a user touch at a surface. In one embodiment, the force vector is measured 605 by one of the processor 105, the force sensor 120, the pointer control module 130, and the vector module 205. The user touch may correspond to the user pressing a finger, thumb, or the like to the surface. Alternatively, the user touch may correspond to the user pressing a stylus, an electronic pen, or the like to the surface. Measuring 605 the force vector includes measuring a magnitude and a direction of the force vector.

The method 600 identifies 610 a touch location corresponding to the user touch. In one embodiment, the touch location is measured 610 by one of the processor 105, the touch sensor 125, the pointer control module 130, and the virtual button module 220. The touch location corresponds to a location on the surface, rather than a location in the user interface.

The method 600 designates 615 a button region on the surface based on the touch location. In one embodiment, the button region is designated 615 by one of the processor 105, the pointer control module 130, and the virtual button module 220. In some embodiments, the button region is a predetermined distance away from the touch location. In further embodiments, a size and/or placement of the button region may be user specific, with a user profile storing a size and/or placement for the button region specific to that user.

The method 600 translates 620 a magnitude of the force vector into a cursor velocity. In one embodiment, the force vector magnitude is translated 620 into the cursor velocity by one of the processor 105, the pointer control module 130, and the velocity module 210. In some embodiments, the magnitude of the force vector corresponds to an amount of force applied perpendicular to the surface. In other embodiments, the magnitude of the force vector corresponds to an amount of force applied parallel to the surface. In yet other embodiments, the magnitude of the force vector include both an amount of force applied perpendicular to the surface and an amount of force applied parallel to the surface.

The method 600 controls 625 movements of a cursor using the cursor velocity and a direction of the force vector. In one embodiment, cursor movements are controlled 625 by one of the processor 105, the pointer control module 130, and the pointer module 215. Controlling 625 movements of the cursor may include instructing an operating system or user interface to move the cursor from a current position in the direction of the force vector and at a speed corresponding to the cursor velocity.

The method 600 controls 620 a user interface based on touches to the button region and the method 600 ends. In one embodiment, the user interface is controlled 620 by one of the processor 105, the pointer control module 130, and the virtual button module 220. The button region may contain one or more virtual buttons. Controlling 620 the user interface based on touches to the button region may include detecting a touch at a virtual button and producing a user input corresponding to the virtual button. For example, if a user touches a virtual right button, then controlling 620 the user interface includes producing a right button click.

Figure 7:
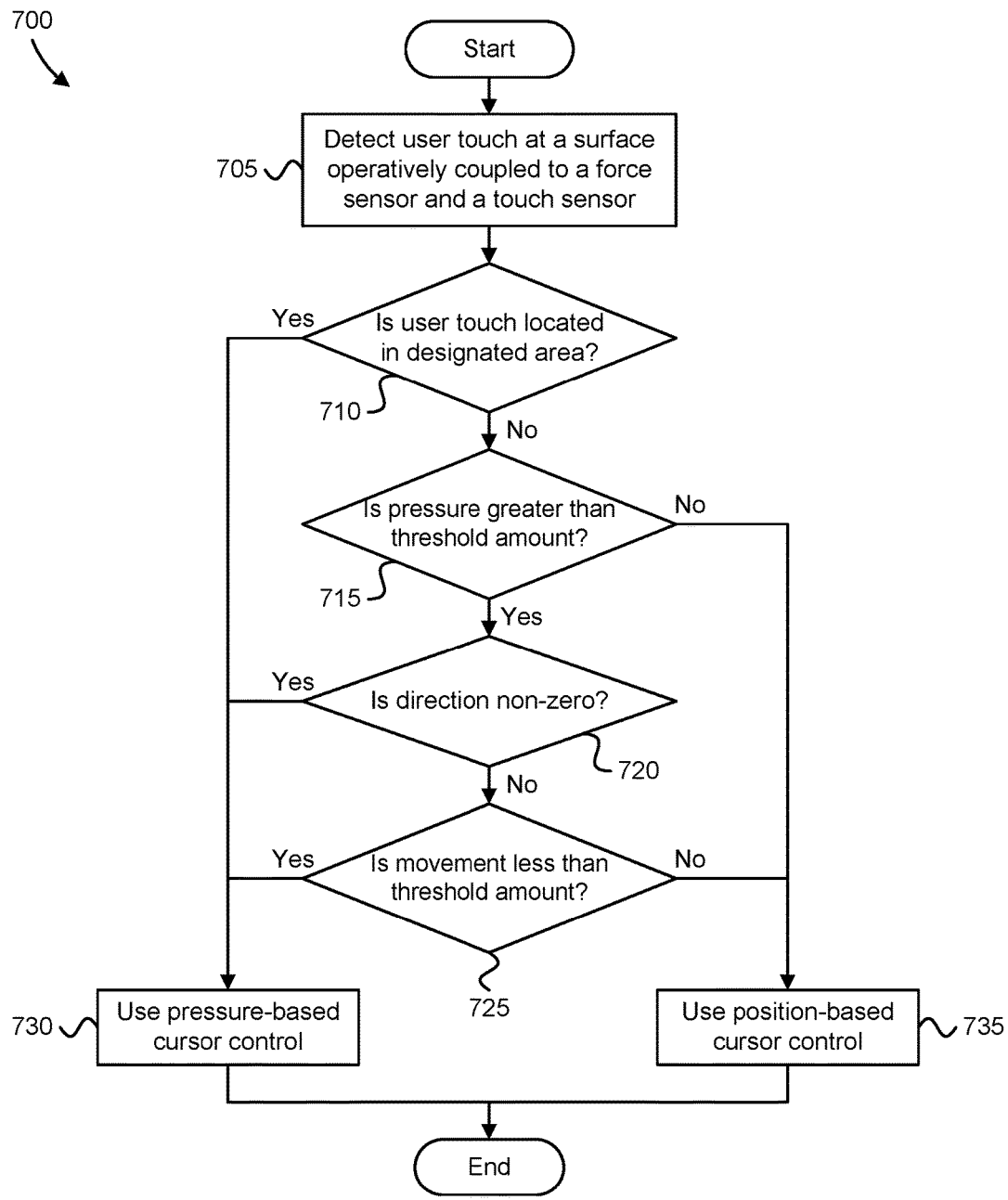
FIG. 7 is a schematic flow chart diagram illustrating one embodiment of a method for switching between pressure-based cursor control and position-based cursor control.

FIG. 7 is a schematic flow chart diagram illustrating a method 700 for switching between pressure-based cursor control and position-based cursor control, according to embodiments of the disclosure. In one embodiment, the method 700 is performed by the electronic device 101. Specifically, the method 700 may be performed by one of the processor 105, the pointer control module 130, and the control mode module 225. In another embodiment, the method 700 may be performed by the apparatus 200. Alternatively, the method 700 may be performed by a processor 105 and a computer readable storage medium, such as the memory 110. The computer readable storage medium may store code that is executed on the processor 105 to perform the functions of the method 700.

The method 700 begins and detects 705 the user touch at a surface operatively coupled to both a force sensor and a touch sensor. In one embodiment, the user touch is detected by one of the processor 105, the force sensor 120, the touch sensor 125, and the pointer control module 130. In response to detecting 705 the user touch, the method 700 determines 710 whether the user touch is located in a designated area of the surface. If the user touch is within the designated area, then the method 700 uses 730 pressure-based cursor control and the method 700 ends.

Otherwise, if the user touch is not within the designated area, the method 700 determines 715 whether a pressure associated with the user touch is greater than a threshold amount. Determining 715 whether the pressure exceeds a threshold amount may include identifying magnitude of a force vector corresponding to the user touch at the surface. If the pressure does not exceed the threshold amount, the method 700 uses 735 position-based cursor control and the method 700 ends.

Otherwise, if the pressure exceeds the threshold amount, then the method 700 determines 720 whether a direction of force vector associated with the user touch is non-zero. Determining 720 whether the direction of the force vector is nonzero may include identifying a direction of the force vector corresponding to the user touch at the surface. If the direction is non-zero, then the method 700 uses 730 pressure-based cursor control and the method 700 ends.

Otherwise, if the direction is zero, then the method 700 determines 725 whether an amount of movement associated with the user touch is less than a threshold amount. Determining 725 whether the movement is less than a threshold amount may include tracking a location of the user touch over a predetermined interval of time (e.g., one second). If the movement is less than the threshold amount, then the method 700 uses 730 pressure-based cursor control. Otherwise, if the movement meets or exceeds the threshold amount, the method 700 uses 735 position-based cursor control. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a force sensor operatively coupled to a surface;
a touch sensor operatively coupled to the surface, the touch sensor measuring a touch location of the user touch;
a processor;
a memory that stores code executable by the processor to:
measure a force vector input by a user touch at the surface, the force vector including a magnitude and a direction;
monitor an amount of movement corresponding to the user touch;
monitor an amount of time corresponding to the user touch;
translate the magnitude into a cursor velocity;
switch to a pressure-based cursor control mode in response to an amount of force corresponding to the user touch exceeding a threshold amount of force, the amount of time exceeding a threshold amount of time, and the amount of movement corresponding to the user touch not exceeding a threshold amount of movement;
switch to a position-based cursor control mode in response to the amount of movement exceeding the threshold amount of movement and the amount of time exceeding a threshold amount of time; and
control movement of a cursor based on the cursor velocity and the direction of the force vector in response to switching to the pressure-based cursor control mode.

2. The apparatus of claim 1, wherein measuring the force vector comprises the processor:
determining a finger tilt corresponding to the force vector input; and
computing a direction component based on the finger tilt.

3. The apparatus of claim 1, wherein measuring the force vector comprises the processor:
determining a contact area corresponding to the force vector input, the contact area corresponding to an area of the surface being touched; and
computing a direction component based on a geometry of the contact area.

4. The apparatus of claim 1, wherein measuring the force vector comprises the processor:
detecting two or more simultaneously input force vectors;
selecting a gesture command based on the simultaneously input force vectors; and
controlling a user interface based on the selected gesture command.

5. The apparatus of claim 1, wherein the touch location indicates a location on the surface corresponding to the user touch, wherein the processor further:
designates a button region on the surface based on the touch location; and controls a user interface based on one or more additional touches at the button region.

6. The apparatus of claim 1, wherein the processor further dynamically switches between a position-based cursor control mode and pressure-based cursor control mode based on user input.

7. The apparatus of claim 1, wherein the surface comprises a designated region, wherein the processor further:
determines whether a user is touching the designated region, the designated region being selected from the group consisting of: a visually marked region, a protruding region, and a textured region,
wherein measuring the force vector occurs in response to the user touching the designated region.

8. A method comprising:
measuring, by use of a processor, a force vector input by a user touch at a surface;
monitoring an amount of movement corresponding to the user touch;
monitor an amount of time corresponding to the user touch;
mapping a magnitude of the force vector into a cursor velocity;
switching to a pressure-based cursor control mode in response to the magnitude of the force vector exceeding a threshold amount of force, the amount of time exceeding a threshold amount of time, and the amount of movement corresponding to the user touch not exceeding a threshold amount of movement;
switching to a position-based cursor control mode in response to the amount of movement exceeding the threshold amount of movement and the amount of time exceeding a threshold amount of time; and
controlling movements of a cursor using the cursor velocity and a direction of the force vector in response to switching to the pressure-based cursor control mode.

9. The method of claim 8, further comprising:
identifying a touch location on the surface corresponding to the user-input force vector;
designating a button region on the surface based on the touch location; and
controlling a user interface based on one or more additional touches at the button region.

10. The method of claim 8, wherein measuring the force vector comprises:
determining a finger tilt corresponding to the force vector input; and
computing a direction component based on the finger tilt.

11. The method of claim 8, wherein measuring the force vector comprises:
determining a contact area corresponding to the user touch, the contact area corresponding to an area of the surface being touched; and
computing a direction component based on a geometry of the contact area.

12. The method of claim 8, wherein measuring the force vector comprises:
detecting two or more simultaneously input force vectors;
selecting a gesture command based on the simultaneously input force vectors; and
controlling a user interface based on the selected gesture command.

13. The method of claim 8, further comprising switching dynamically between the position-based control mode of the cursor and the force-based control mode of the cursor based on user input.

14. A program product comprising a computer readable storage medium that is not a transitory signal and that stores code executable by a processor, the executable code comprising code to:
measure a force vector input by a user touch at a surface, the force vector comprising a perpendicular component and a parallel component, wherein the perpendicular component represents an amount of force applied in a direction perpendicular to the surface and the parallel component represents an amount of force applied in a direction parallel to the surface;
measure a touch location of the user touch and an amount of movement corresponding to the user touch;
monitor an amount of time corresponding to the user touch;
translate a magnitude of the perpendicular component of the force vector into a cursor velocity, wherein translating the magnitude into a cursor velocity comprises using one of a linear mapping of magnitude to cursor velocity and a non-linear mapping of magnitude to cursor velocity; and
control movements of a cursor according to a position-based control mode in response to the amount of movement exceeding a threshold amount of movement and the amount of time exceeding a threshold amount of time; and
controls movements of the cursor according to a pressure-based control mode in response to an amount of force corresponding to the user touch exceeding a threshold amount of force, the amount of time exceeding a threshold amount of time, and the amount of movement corresponding to the user touch not exceeding a threshold amount of movement,
wherein controlling movements of the cursor according to a pressure-based control mode comprises moving the cursor using the cursor velocity and a direction of the parallel component of the force vector.

15. The program product of claim 14, further comprising code to:
identify a touch location on the surface corresponding to the user-input force vector;
designate a button region on the surface based on the touch location; and
control a user interface based on one or more additional touches at the button region.

16. The program product of claim 14, further comprising code to:
switch dynamically between a position-based control mode of the cursor and a force-based control mode of the cursor based on user input.

17. The program product of claim 14, further comprising code to:
determine whether a user is touching a designated region of the surface, wherein measuring the force vector occurs in response to the user touching the designated region.

18. The apparatus of claim 1, wherein the processor controls movement of the cursor based on the amount of movement corresponding to the user touch in response to switching to the position-based cursor control mode.

19. The apparatus of claim 1, wherein translating the magnitude into a cursor velocity comprises using a non-linear mapping of magnitude to cursor velocity.

* * * * *